July 3, 1934.  S. V. FULLAWAY  1,964,908
WHEEL TIRE
Filed Aug. 21, 1933  2 Sheets-Sheet 1

Inventor
S. V. Fullaway
By Hiram A. Sturges  Attorney

July 3, 1934.  S. V. FULLAWAY  1,964,908
WHEEL TIRE
Filed Aug. 21, 1933  2 Sheets-Sheet 2

Inventor
S. V. Fullaway
By Hiram H. Sturges
Attorney

Patented July 3, 1934

1,964,908

UNITED STATES PATENT OFFICE 1,946,908

WHEEL TIRE

Samuel V. Fullaway, Omaha, Nebr.

Application August 21, 1933, Serial No. 685,980

7 Claims. (Cl. 152—8)

This invention relates to an improvement in wheel tires and more particularly to a substitute for the pneumatic tube generally used within the casing of a vehicle tire and depended upon for providing resiliency.

Since these inner tubes have usually been constructed of rubber and often become injured or unduly worn to cause deflation, various expedients have been resorted to for preventing deflation, and I am aware that springs of various forms and other metallic parts have been used to provide the resiliency and durability as substitutes, but I am not aware that these metallic substitutes have met with public favor or have been sufficiently practical to go into general use.

The object of the present invention, broadly, is to provide a resilient tubiform inner tire constructed entirely of metal which may be inserted in any usual type of rubber casing and of such arrangement of parts that it may have any required degree of resiliency, will be durable and will consist of few and simple parts for convenience and economy in manufacture.

The herein described improvement operates as an inner resilient tube for wheel tires in connection with automobiles, busses, trucks, railway cars or other propelled vehicles, and includes such a construction that it may be used upon wheels of various diameters, will permit convenient removal for an interchange of parts, and provides for expansion and contraction of metals.

With the foregoing objects in view and others appearing hereinafter, the invention presents a new and useful construction, combination and arrangement of parts as described herein and claimed, and as illustrated in the accompanying drawings, it being understood that changes may be made in form, size, proportion of parts and minor details, said changes being within the scope of the invention as claimed.

In the drawings, Fig. 1 is a side view of a wheel tire partly in section.

Figure 1:
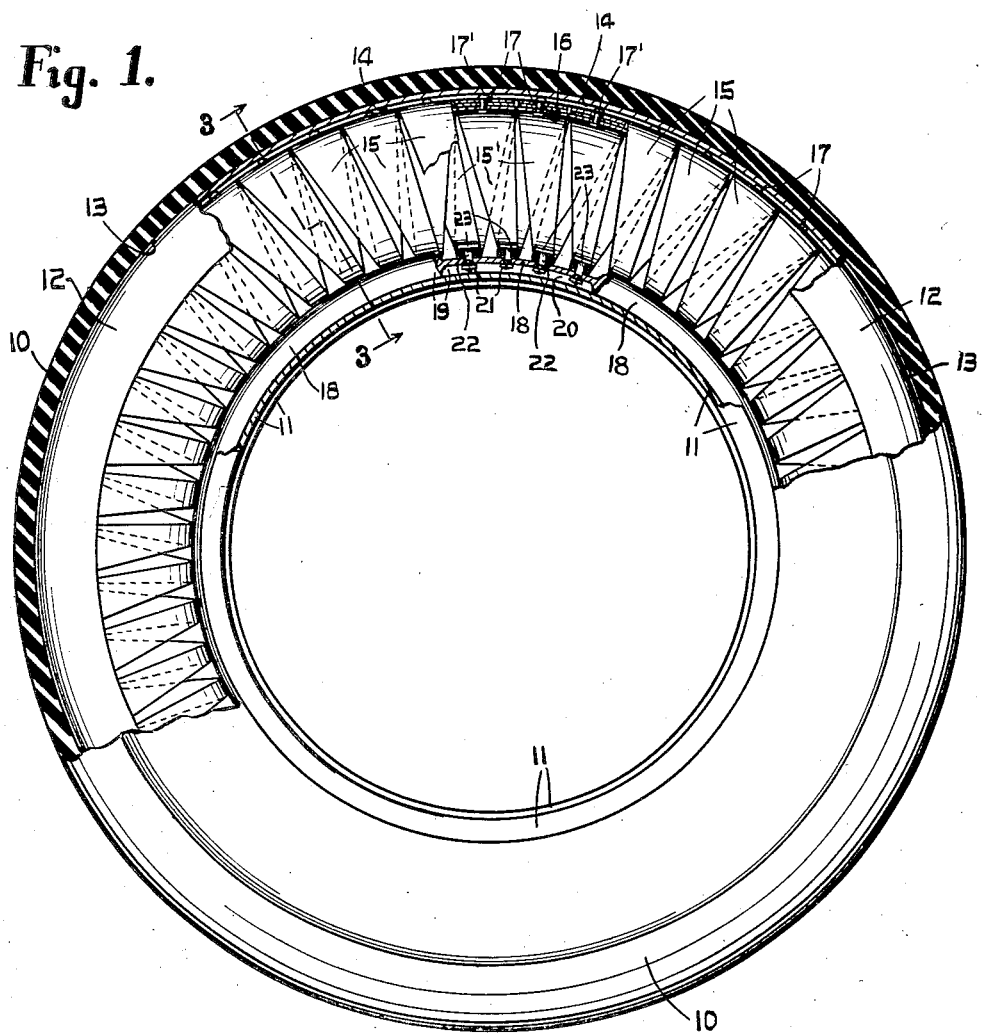
Figure 2:
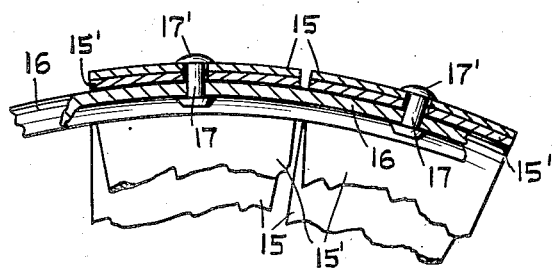
Fig. 2 is a sectional detail on an enlarged scale, showing pairs of leaf springs riveted to a spacing-ring and maintained in spaced relation.
Figure 3:
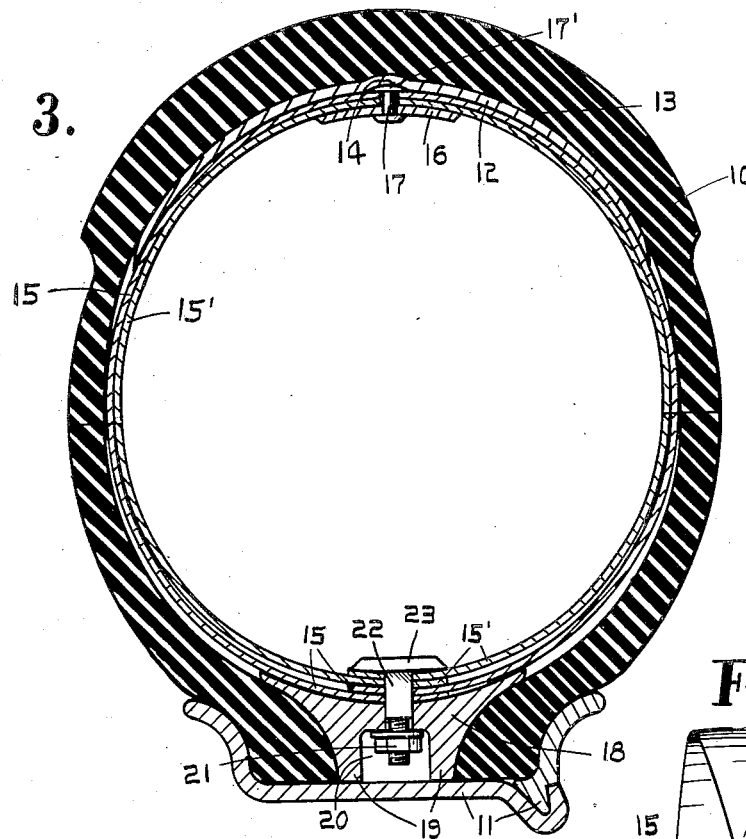
Fig. 3 is a view of a wheel tire in transverse section on line 3—3 of Fig. 1, embodying the invention.

Referring now to the drawings, in which like numerals indicate like parts, for a description of construction in detail, the invention is described in connection with a tire casing 10 and rim 11, these being of usual construction used upon vehicle wheels, and it may be stated that the casing, generally constructed of rubber, may have any suitable thickness so far as the present invention is concerned, and may have any required form in cross-section provided, of course, that it has an inner wall of concave form in cross-section for receiving the parts to be described of the inner tubiform resilient tire which constitutes the present invention.

The invention consists, in part, of a circular unattached tread-band 12 of concavo-convex form in cross-section adapted to fit snugly in the casing 10 adjacent the periphery thereof in engagement with the inner concave wall 13 of said casing. It is preferably constructed of spring steel and is provided midway between its edges and longitudinally thereof with a groove 14 for uses to be presently described.

Numerals 15 indicate outer loops or leaf springs and numerals 15' indicate inner loop or leaf springs, said springs being of loop or spiral form and used in pairs.

I employ a spacing-ring 16 of concavo-convex form in cross-section, said spacing-ring being circumscribed by the circular tread-band, and by means of rivets or other suitable keepers 17 the several pairs of leaf springs 15 and 15' are secured to the spacing-ring 16.

It will be noted that the rivets 17 extend through suitable apertures which are provided at intervals in the spacing-ring, and apertures are formed in said springs midway between their ends for receiving the rivets.

Also it will be noted that the leaf springs are formed convergent from their middle toward their ends, and that they also have a limited transverse curvature.

Numeral 18 indicates a circular anchor-strip which is also of concavo-convex form in cross-section and is disposed in that part of the casing opposite to the periphery thereof.

One of the functions discharged by the anchor-strip 18 is to provide a firm mounting for the ends of the leaf springs 15 and 15', and another object is to prevent torsion and to maintain the middle parts of said leaf springs firmly in normal position adjacent to the periphery of the casing, and it will be noted that the heads 17' of the rivets 17 engage in the groove 14 which tends to prevent torsion of the inner tire.

The thickness and proportions for the leaf springs depend upon the diameters of the wheels and type of vehicle upon which the tires are to be used, and spring steel is preferably used in their production.

For convenience when assembling the parts and to maintain the ends of the springs in fixed relative positions the anchor-strip 18 is provided with a pair of ridges 19 and a channel 20 between said ridges, said ridges being supported to advantage by the rim 11 and by the edges of the casing 10, said channel 20 providing convenient access to the rotatable nuts 21 which are mounted on the threaded ends of the screws or keepers 22, the body of each keeper 22 being rectangular in cross-section to prevent any lateral swinging movements of the ends of the springs 15 and 15' which are mounted thereon, the apertures in the end-portions of said springs also being rectangular in plan for receiving said keepers.

Each keeper 22 is provided with a head 23, and it will be understood that when a nut 21 is rotated in one direction the end portions of the leaf springs will be firmly pressed against the anchor-strip 18. The rectangular apertures in the anchor-strip 18 for receiving the rectangular parts of the keepers 22 are indicated at 24, best shown in Fig. 4 of the drawings.

Each leaf spring preferably consists of a single loop or coil, but since it extends longitudinally of the casing it is of spiral form.

It will be noted that the springs 15 and 15' of each pair intersect each other midway between their ends at each rivet 17, and that the body-portions of the leaf springs of each pair extend longitudinally in the casing in reverse directions. As shown in the drawings each rivet 17 secures two parts to the spacing-ring, these two parts being the middle portions of the spiral leaf springs 15 and 15', each keeper 22 supporting four parts, said four parts being the ends of two pairs of adjacently disposed springs, each end-portion of the springs of a pair engaging an end-portion of a spring of a pair adjacent thereto.

While I have shown leaf springs arranged pairs, I do not limit myself, and in some instances single springs may be used, depending upon the kind of vehicle wheels employed. Also, while I have shown and prefer spiral leaf springs each consisting of a single loop or coil I may use a greater number of loops or coils for each spring in some instances.

Figure 4:
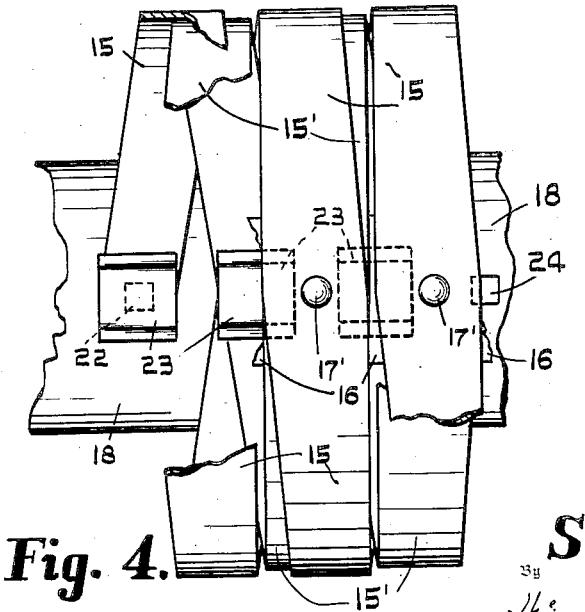
Fig. 4 is a broken away fragmentary plan view, partly in section, showing parts of the inner tubiform tire, the casing being removed to show leaf springs in pairs and showing the anchor-strip.
Figure 5:
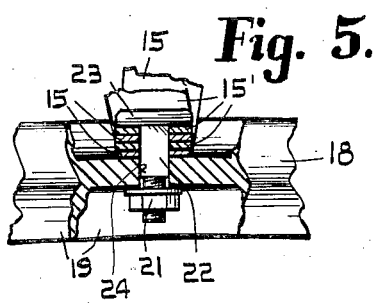
Fig. 5 is an enlarged detail relating to Fig. 3, showing the mounting of one of the bolts, rectangular in cross-section, for securing the ends of the leaf springs to the anchor-strip, said view being taken at right angles to the view of parts shown in Fig. 3.

It will be noted, as shown in Figs. 1 and 4 of the drawings that the springs are disposed in spaced relation longitudinally of the casing to permit free movements thereof and to allow for expansion.

The principal function discharged by the concavo-convex tread-band 12 is to protect the peripheral part of the casing from undue wear which might otherwise be caused by contact of the springs with said casing.

It will be appreciated that uniformity will be attained in the yielding resistance or resiliency of the leaf springs since the springs of each pair are inclined in directions reverse to each other. As clearly shown in the drawings each outer spring 15 of a pair extends longitudinally of the casing a limited distance in one direction, the other spring 15' of said pair extending in an opposite direction in said casing, the result being that the spiral springs of each pair will be disposed in spaced relation at the mounting of their ends on the anchor-strip. This reverse inclination is considered to be an advantage and quite necessary to attain uniformity of stresses directed to the tire during operation and as an aid in attaining elastic action.

Figure 6:
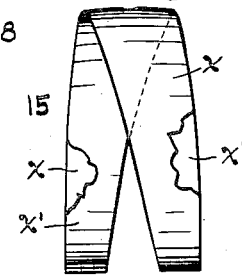
Fig. 6 shows a spring of modified form.

In order that each spring 15 and 15' of each pair may yield readily to shocks and vibrations incident to the use of the tire, and that a greater degree of resiliency may be attained with lesser weight and amount of material, I have shown, as illustrated in Fig. 6 of the drawings that each leaf spring may consist of a plurality of attenuated leaves x and x' of uniform shape disposed in massed formation, one upon another, to operate as a unit. While in Fig. 6 I have shown only two of these leaves for a single spring the number may be greater or less, as desired, and in some instances I may use this spring of modified type, since it provides the advantages mentioned.

I claim as my invention,—

1. In a tire for a wheel having a rim, a tire casing, a circular tread-band in the casing adjacent to the periphery thereof, a spacing-ring inwardly of the tread-band, an anchor-strip having a pair of peripheral ridges engaging said rim and providing a channel between said ridges opening on said rim, a plurality of circular spring-loops having apertures at their ends and arranged in pairs, the loops of each pair intersecting each other midway between their ends and secured at their intersection to the spacing-ring and threaded keepers in said channel traversing the anchor-strip and apertures of the spring-loops for securing the ends of said loops to said anchor-strip.

2. In a tire for a wheel having a rim, a tire casing, a tread-band in the casing, a spacing-ring adjacent to the tread-band, a circular anchor-strip engaging and having a peripheral channel opening upon said rim, a plurality of circular spring-loops each formed convergent toward its ends and provided at its ends with rectangular apertures, said loops being arranged in pairs, the loops of each pair intersecting each other midway between their ends and inclined in directions opposed to each other longitudinally of the tire, means for securing the loops of each pair at their intersection to the spacing-ring, and a plurality of keepers disposed in said channel each having a part rectangular in cross-section traversing the anchor-strip and rectangular apertures of the spring-loops for securing said loops to the anchor-strip.

3. In a tire for a wheel having a rim, a tire casing, a tread-band in the casing near the periphery thereof, a spacing-ring inwardly of the tread-band, an anchor-strip engaging and having a peripheral channel opening on said rim, a plurality of circular spring-loops arranged in pairs and having apertures at their ends, the loops of each pair being disposed in intersecting relation midway between their ends and secured to the spacing-ring, and threaded keepers in said channel traversing the anchor-strip and apertures of the spring-loops, each end-portion of a loop of a pair engaging an end-portion of a loop of a pair adjacent thereto.

4. In a tire for a wheel having a rim, a tire casing, a circular tread-band provided longitudinally with a groove and disposed in the casing near the periphery thereof, a spacing-ring circumscribed by the tread-band, a circular anchor-strip engaging said rim and provided with rectangular apertures, a plurality of circular transversely-curved spring-loops formed convergent toward their ends and provided at their ends with rectangular apertures, said loops being arranged as intersecting pairs, a plurality of keepers each traversing a pair of loops at their intersection and said spacing-ring and engaging in the groove of the tread-band, and a plurality of keepers rectangular in cross-section disposed in the apertures of the anchor-strip and rectangular apertures of the spring-loops.

5. In a tire for a wheel having a rim, a tire casing, a circular tread-band in the casing near the periphery thereof, a spacing-ring circumscribed by the tread-band and provided at intervals with keepers, a circular anchor-strip abutting upon said rim and provided at intervals with keepers, and a plurality of circular spring-loops arranged in pairs one inwardly of the other, the loops of each pair being engaged midway between their ends by a keeper of the spacing-ring for a mounting thereon, the ends of the loops of each pair being engaged by two adjacently disposed keepers of the anchor-strip for mountings thereon.

6. In a tire for a wheel having a rim, a tire casing, a circular tread-band in the casing, a spacing-ring circumscribed by the tread-band and provided with keepers at intervals, a circular anchor-strip abutting upon said rim and provided with keepers at intervals, a plurality of circular spring-loops each formed convergent toward its ends and having a transverse curvature, said loops being arranged in pairs, the loops of each pair intersecting each other midway between their ends and engaged at said intersection by a keeper of the spacing-ring, the ends of the loops of each pair engaging a pair of adjacently disposed keepers of said anchor-strip.

7. In a tire for a wheel having a tire casing and a rim, a circular tread-band provided longitudinally at its medial line with a groove and disposed in the casing, a spacing-ring circumscribed by the tread-band, keepers traversing the spacing-ring at intervals thereof and engaging in the groove of the tread-band, a circular anchor-strip abutting upon said rim and provided with keepers at intervals thereof, and a plurality of spring-loops each formed convergent toward its ends, said loops being arranged in pairs, the loops of each pair intersecting each other midway between their ends and engaged at their intersection by a keeper of said spacing-ring, the ends of the loops of each pair engaging a pair of adjacently disposed keepers of said anchor-strip.

SAMUEL V. FULLAWAY.